UNITED STATES PATENT OFFICE.

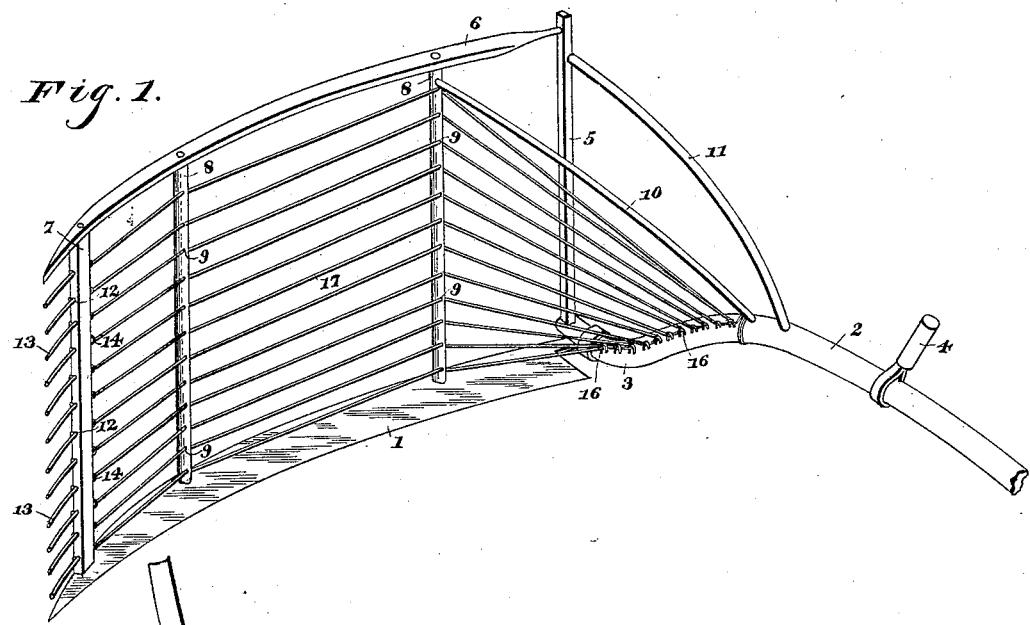

THOMAS W. ORR, OF JONESBOROUGH, GEORGIA.

GRAIN-CRADLE.

SPECIFICATION forming part of Letters Patent No. 424,899, dated April 1, 1890.

Application filed November 21, 1889. Serial No. 331,074. (No model.)

*To all whom it may concern:*

Be it known that I, THOMAS W. ORR, a citizen of the United States, residing at Jonesborough, in the county of Clayton and State of Georgia, have invented a new and useful Grain-Cradle, of which the following is a specification.

This invention has relation to improvements in grain-cradles, and among the objects in view are to simplify the construction, reduce the cost of manufacture and repair, and adapt the lacing of the same to be readily replaced in case of breakage or when worn without the use of tools or employment of skilled workmen.

Further objects and advantages of the invention will hereinafter appear, the novel features thereof being particularly pointed out in the claims.

Referring to the drawings, Figure 1 is a perspective of a cradle constructed in accordance with my invention. Fig. 2 is a transverse section looking toward the handle. Fig. 3 is an enlarged detail in section through the rake-bar.

Like numerals of reference indicate like parts in all the figures of the drawings.

1 represents the scythe-blade, the heel of which is in the usual manner connected to the handle 2, which is curved at its lower end, as at 3, and about midway the same provided with a hand-grip 4. From the lower end of the handle 2 and projecting at a right angle to the blade is a transverse bar 5, and connected at its rear end with the outer end of said bar and extending parallel with the blade is a curved longitudinal bar 6, the forward end of which and the point of the blade is connected by a transverse rake-head 7. The bar 6 and the blade 1 intermediate the rake-head and rear bar 5 are connected by two transverse bars 8, each of which is provided with a series of minute transverse perforations 9 near their upper edges, the perforations of one bar being in longitudinal line with those of the other and the rear bar of the pair being connected and braced to the handle 2 at the terminal of its curved portion by an inclined brace 10. A similar brace 11 connects the rear bar 5 with the handle.

The rake-bar 7 is provided with a series of transverse perforations 12, said perforations registering with the perforations 9, formed in the transverse bars 8, and in each of the perforations 12 there is mounted a rake-tooth 13, the points of which occur in a line with the extremities of the longitudinal curved bar 6 and the blade 1. The rake-teeth 13 near their rear ends are bent upon themselves to form eyes 14, and the two terminals are passed forwardly through the perforations 12, one terminal forming a rake-tooth and the other bent over and clinched upon the rake-bar. The teeth may be of other forms, the only essential feature being that they terminate at their rear ends in eyes.

The front lower face of the handle 2 at its curved portion is provided with a series of uniformly-spaced eyes 16, said eyes being a distance apart agreeing with the rake-teeth and the perforations 9.

17 represents the lacing, in this instance formed of a continuous stand of cord of sufficient strength and toughness, which, if desired, may be coated with a substance rendering it impervious to moisture. One terminal of the cord is in this instance secured to the lower eye 16 of the series, and its opposite terminal is then passed through the opposite opening 9 in the rear bar 8, thence through the companion opening in the front bar 8 and through the first pair of eyes 14 of the rake-teeth, thence to the rear through the openings 9 and through the next two eyes 16, and thence back and forth through the eyes and openings until the space formed by the frame-work described is occupied by the longitudinal lacing, the end of the cord being suitably secured to the handle at the upper end of the series of eyes 16.

By experience I have found that the substitution of cord for wire is a great improvement in that if a break occurs, and it generally does while the cradle is in operation in the field, no time may be lost in taking the cradle to the shop for repairs, but the cord can be easily renewed or spliced in the field.

In constructing the cradle, the cord being flexible and less expensive, it will be observed that the manufacture of the device is facilitated and its cost consequently lowered. The rake-teeth also form the double function of lacing-eyes and teeth.

Having described my invention, what I claim is—

1. In a grain-cradle, the combination, with the scythe-blade, and the curved handle connected to the heel of the same and provided with a series of eyes, of an opposite longitudinal curved bar parallel with the blade, a series of transverse bars connecting the blade and bar, the front one of which is provided with a series of eyes, braces connecting the transverse bars with the handle, a series of teeth mounted in the front bar of the series and forming the rake, and a lacing connecting the eyes of the handle with those of the front bar and intermediately connected with the transverse bars, substantially as specified.

2. In a grain-cradle, the combination of the scythe-blade, the handle connected to the heel of the same, the opposite curved longitudinal bar, the transverse bars connecting the longitudinal bar with the scythe-blade, a series of rake-teeth mounted in the forward transverse bar and terminating in rear of said bar in lacing-eyes, a series of lacing-eyes secured to the handle, perforations formed in the intermediate bars, and a continuous lacing connecting the eyes of the handle, the bars, and eyes of the rake-teeth, substantially as specified.

3. In a grain-cradle, the combination, with the scythe-blade, the handle connected to the heel of the same, the opposite curved longitudinal bar, transverse bars connecting the same, teeth mounted in the front bar and terminating at their ends in eyes, a series of eyes mounted in the handle, and perforations formed in the transverse bars, of a lacing formed of cord and continuous, one terminal of the lacing being connected to an eye on the handle and woven through the perforations and eyes of the rake-teeth, forming longitudinal parallel strands, substantially as specified.

4. The combination, in a cradle, of the perforated rake-bar and a series of rake-teeth mounted in the perforations, bent upon themselves near their centers to form eyes in rear of the bar, and having the terminals passed through the bar, one extended forwardly and forming the rake-tooth and the other clinched upon the bar, and lacing-cords passed through the eyes and connected to the frame-work, substantially as specified.

In testimony that I claim the foregoing as my own I have hereto affixed my signature in presence of two witnesses.

THOMAS W. ORR.

Witnesses:
G. H. ELLIS,
JNO. M. MUNDY.